United States Patent [19]

Duveau

[11] 4,427,551
[45] Jan. 24, 1984

[54] SOLIDS SEPARATION AND LIQUID CLARIFICATION SYSTEM

[76] Inventor: Jean Duveau, 12 rue des Montatons, 91240 Saint Michel sur Orge, France

[21] Appl. No.: 303,550

[22] Filed: Sep. 18, 1981

[51] Int. Cl.³ .......................... B01D 37/04; C02F 1/52
[52] U.S. Cl. .................................. 210/741; 210/791; 210/805; 210/806; 210/110; 210/258
[58] Field of Search ............... 210/202, 252, 254, 805, 210/806, 350, 739, 741, 200, 201, 203, 90, 98, 808, 259, 137, 102, 103, 104, 106, 108, 109, 110, 709; 209/273, 17, 233

[56] References Cited

U.S. PATENT DOCUMENTS

| | | | |
|---|---|---|---|
| 1,251,500 | 1/1918 | Gentes | 209/17 |
| 2,971,648 | 2/1961 | Lane et al. | 210/741 |
| 3,291,308 | 12/1966 | Headrick et al. | 210/254 |
| 3,291,562 | 12/1966 | Anderson | 210/806 |
| 3,638,793 | 2/1972 | Peck | 210/805 |
| 3,788,469 | 1/1974 | Hirsch et al. | 210/805 |
| 3,883,429 | 5/1975 | Hanford | 210/202 |
| 3,890,229 | 6/1975 | Eder | 210/805 |
| 3,929,639 | 12/1975 | Turner et al. | 210/805 |
| 3,957,637 | 5/1976 | Morey | 210/741 |
| 4,213,863 | 7/1980 | Anderson | 210/350 |
| 4,290,894 | 9/1981 | Torok et al. | 210/661 |
| 4,350,594 | 9/1982 | Kawai et al. | 210/137 |

FOREIGN PATENT DOCUMENTS

| | | | |
|---|---|---|---|
| 2651937 | 5/1978 | Fed. Rep. of Germany | 209/17 |
| 50-57955 | 5/1975 | Japan | 210/806 |

*Primary Examiner*—Charles N. Hart
*Assistant Examiner*—John W. Czaja
*Attorney, Agent, or Firm*—Thomas E. Spath

[57] ABSTRACT

A unitary method and system for the continuous clarification, and if desired, purification of a liquid medium containing solid particulate matter is described which system comprises.

(a) means for delivering a continuous stream of the liquid medium containing the solid particulate matter to a first separator means wherein solid matter having a nominal diameter greater than about 3 millimeters is removed from the stream;

(b) a pump capable of pressurizing the stream discharged from the first separator and conduits connecting the pump to the first separator means and to a second separator means;

(c) second separator means capable of removing from the pressurized liquid stream solid material having a nominal diameter less than about 3 millimeters and greater than about 75 microns;

(d) a flocculating unit, and associated conduits for receiving the liquid stream discharged from the second separator, said flocculating unit comprising means for chemically treating the liquid stream as it passes through to flocculate solid particulate matter suspended in the liquid stream;

(e) a fine filter means and associated conduits for receiving the pressurized liquid stream discharged from the flocculating unit, said fine filter means comprising a filter medium which entrains and separated from a continuous pressurized liquid stream passing therethrough solid particles having a nominal diameter in excess of about one micron;

(f) discharge means associated with the fine filter unit for delivery of a stream of clarified liquid medium; and optionally, (g) a chlorination unit and associated clarified liquid medium wherein chlorine is dissolved in the liquid to destroy bacterial and virial contaminants and discharge means for delivering a stream of purified liquid medium.

9 Claims, 4 Drawing Figures

900
SOLIDS SEPARATION AND LIQUID CLARIFICATION SYSTEM

BACKGROUND OF THE INVENTION (1) Field of the Invention

This invention relates to the treatment of aqueous or other liquid sludges and more particularly to a process and system for clarifying a liquid medium containing solid particulate matter by separating the solid constituents comprising the sludge from the aqueous or other liquid medium to thereby clarify the water or other liquid. The invention has utility in the continuous treatment of a liquid containing solid particulate matter, where the liquid to be treated enters the system continuously or from a collection vessel and solids are separated and removed and the stream is clarified so that it can be discharged into municipal sewers or adjacent rivers and streams.

(2) Description of the Prior Art

Sludge results from sewage treatment processes, is produced in municipal water purification facilities and is found as a by-product of almost all industrial, chemical and commercial operations. In many continuous processes, and in some batch operations, the sludge is pumped as a mixture of solids in water and other liquid chemicals into a storage vessel, such as a tank, concrete pit, or the like. In the storage vessel the sludge, which has a moisture content of from about 90% to 98% is allowed to stand.

The heavier components of the sludge gradually settle to the bottom of the tank or vessel and it is a common practice to use a floating pump to remove as much of the water as possible. Alternatively, baffles may be employed in the settling vessel with an overflow pipe located opposite the feed pipe. When the vessel has reached its capacity and the maximum amount of aqueous sludge-containing medium has been decanted, the remaining sludge is removed by a combination of mechanical and manual means. Present techniques require workers to enter the vessels to manipulate the equipment or to actually shovel the heavy solids during cleaning operations.

The further handling and disposal of this sludge with its high water content can present a serious problem. Methods such as drying in open beds, flash and spray drying require large investments in land and/or capital, and any drying system operating at high temperature may be prohibitively expensive to operate unless waste heat is available from other sources.

Another option for disposing of accumulated sludge is simply to contract with a third-party to carry the material away in drums, tankers or the like. Such services are likewise becoming costly as available disposal sites diminish and as governmental regulations on treatment and disposal become more stringent.

A further problem exists with respect to the decanted liquid, which is seldom clear enough to re-use or to be discharged into the municipal sewer or nearby river without further treatment. Most governmental units have established regulations regarding the chemical composition, and the physical size of solid particulate matter which can be discharged into municipal sewer systems or returned to natural streams and rivers. In other cases the liquid may be a solvent which must be disposed of safely.

It is therefore a purpose of this invention to provide a system and process for the treatment of solid-containing liquid effluents to effect a complete clarification of the liquid medium.

It is also a purpose of this invention to provide a system and process capable of clarification of a liquid medium which has either a continuous or discontinuous flow.

Another purpose of this invention is to provide a system and process for use in the cleaning of settling, or decantation tanks to effect the removal of sludge and solid particulate matter which does not require a worker to enter the tank or vessel.

It is also an important purpose of this invention to provide a unitary, integrated system and process for the treatment of an aqueous medium containing solid matter which combines the separation of heavy particles with extra fine filtration, at either a constant or a discontinuous flow, to effect the complete removal of solid particulate matter greater than about 1 micron contained in the water to thereby permit the collection or recycling of clarified and if desired substantially pure water.

It is a further goal of this invention to provide a completely automated process and system for cleaning the interior of sludge settling tanks without human intervention, and to provide for removal of the sludge and solid particulate matter, as well as fine filtration, which permits direct discharge into the sewer of clarified, and if desired, chemically neutralized aqueous effluent.

Another objective of the invention to provide for a system and process as described above which can be fixed or mobile without limitation as to the continuous or discontinuous nature of the flow of the liquid stream to be treated.

It is also an object of the invention to provide a continuous process and system for the treatment of chemical and industrial wastes comprising solids and non-aqueous liquid solvents, such as organic solvents, in which the solid particulate matter having a diameter of one micron and larger are removed and collected, and the liquid solvent medium is clarified and collected for further use.

DETAILED DESCRIPTION

Figure 1:
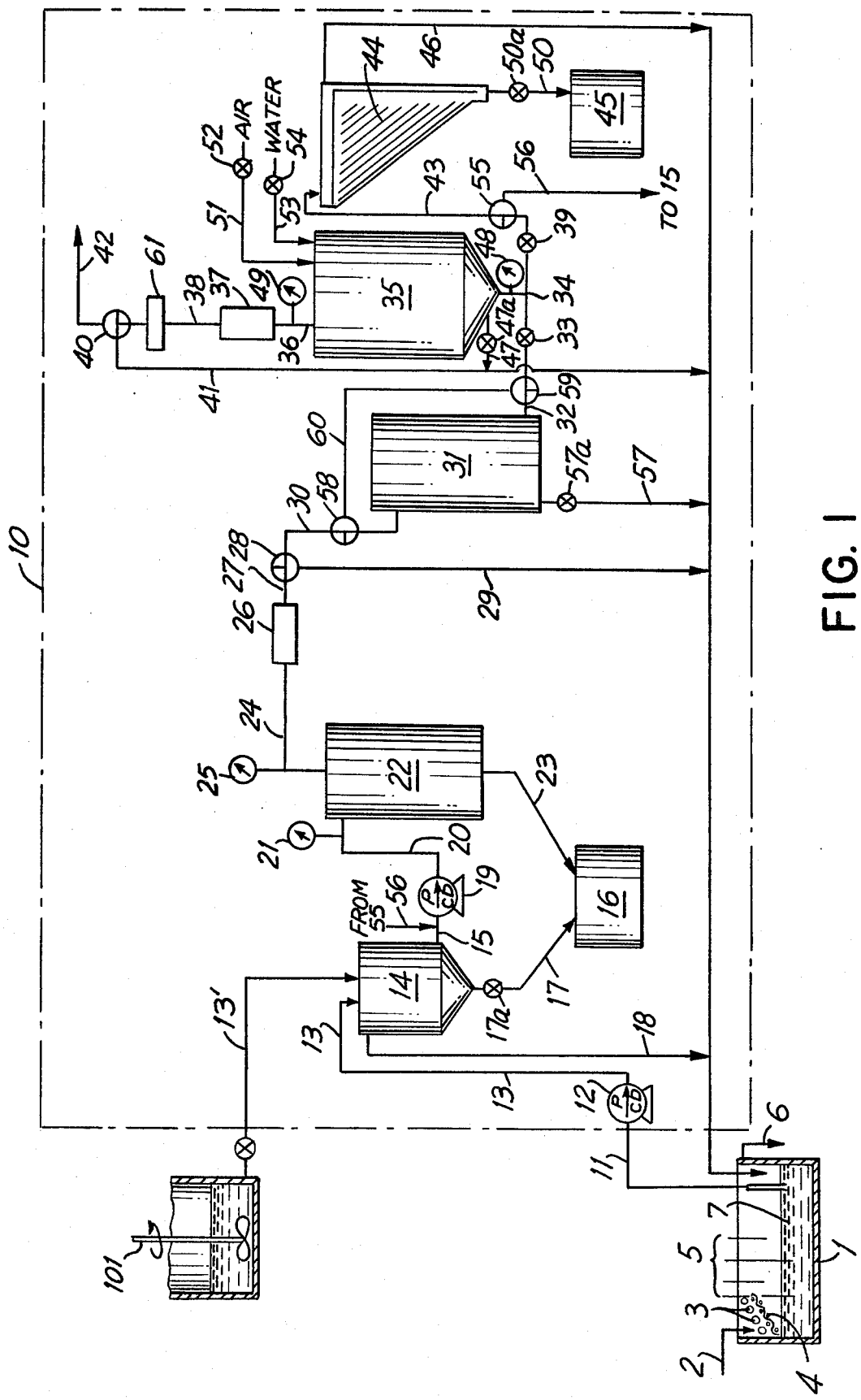
FIG. 1 depicts schematically one preferred embodiment of the system and process of the invention.

The following summary description of the invention identifies the principal elements and the manner in which the system and process function to achieve the purposes set forth above.

The term 'solid particulate matter' as used in this description and in the claims includes suspended particles having a nominal diameter of about one micron and larger and also debris such as rocks, sticks, metal scraps, concrete, etc. having a nominal diameter of about seven (7) centimeters. Conventional screens or baffles as described below are used to preclude entry into the system of large debris.

Sludge comprising solid particulate matter in a liquid medium is delivered to storage vessel 1 via inlet conduit 2 where it accumulates. Vessel 1 is typically outfitted with racks 3 and screens 4 to effect removal from the incoming stream of course solids and debris having a nominal diameter of seven (7) cm or greater. Baffles 5 can also be installed to reduce turbulence and aid the settling of the heavier components in the sludge. The settling vessel can also be fitted with an overflow conduit 6 to remove the decanted liquid, or simply to control the volume of material admitted to the vessel.

The unitary system of the invention is identified as element 10 in the schematic representation of FIG. 1 and is comprised of the elements which are next described. Projecting down into the aqueous sludge to a depth which is variable is sludge removal conduit 11, which is attached to the inlet or suction side of primary pump 12. Pump 12 is of a size and capacity which is capable of handling relatively large solid particles of up to 5 to 7 cm in diameter. Use of a vortex or turbine pump is preferred, although pneumatically actuated diaphram pumps and centrifugal pumps can be adapted for use in the system. The selection of suitable pumps will be apparent to one familiar with the art and is exemplified by the equipment described in Perry's *Chemical Engineer's Handbook* (5th Ed.) pp. 6–5 through 6–14, the disclosure of which is herein incorporated by reference.

Conduit 13 delivers the liquid stream from the outlet side of pump 12 to a first separator means 14 where the primary separation takes place. Unit 14 removes the large particles from the material. First separator means 14 can be open, is unpressurized and typically contains a wire mesh basket or other screening device which removes solids having a nominal diameter of greater than about 3 mm from the passing stream. The stream is gravity fed through separator 14. Separated solids drop to the bottom of 14 and are periodically discharged via conduit 17 and valve 17*a* into waste collector means 16.

The partially treated effluent from separator means 14 is discharged through conduit 15. Since the flow rate of material through separator 14 may vary with the particular character of the material being processed in the system, the capacity of pump 12 is sufficient to insure that separator 14 is filled at all times. Conduit 18 located at the top of separator 14 returns the excess feed, or overflow, to storage vessel 1. The volumetric flow rate of the liquid medium containing solid matter to separator 14 is preferably from 1.2 to 2 times the volumetric flow rate of the discharge from pump 19.

Conduit 15 delivers the stream to the inlet side of pump 19, which pressurizes the partially treated liquid stream for treatment in the remaining steps in the process. Delivery to the second separator means 22 is via conduit 20.

Secondary separator means 22 is designed to remove solids from about 3 mm down to about 75 microns nominal diameter. The solids removed from the liquid phase are discharged through conduit 23 into waste collector means 16. The effluent which leaves unit 22 via conduit 24 contains suspended particles having a maximum size of less than about 75–100 microns. Under optimum operating conditions the separator 22 can collect particles having a nominal diameter of at least 75 microns and a density of from 1.3 to 1.5 times that of the liquid medium. Typical performance tests indicate recovery of 98% of particles having a nominal diameter of 80 microns.

As shown in FIG. 1, conduits 20 and 24 are equipped with pressure gages, identified as 21 and 25, respectively. These gages are employed to monitor the pressure difference, or drop, over the separator 22 in order to insure the efficacy of the separator.

Down stream of the separator 22 conduit 24 is fitted to flowmeter 26 which is employed in conjunction with three-way valve 28 to maintain the proper differential in pressure across the separator unit 22. Automated electro-mechanical systems can be installed so that flow is adjusted through valve 28 in direct response to changes in the signals from the pressure gages 21 and 25, and flow meter 26.

The effluent passes through the flowmeter 26 and conduit 27 connected to three-way valve 28 which controls the flow between conduits 29 and 30. Conduit 29 is a return to the storage/settling vessel 1. Conduit 30 feeds the twice-treated liquid stream to flocculation unit 31.

Depending on the nature of the material to be treated and the purposes of the system, flocculation may be accomplished either in unit 31 as shown in FIG. 1 after the secondary separator 22, or in vessel 1 containing the liquid-solid mixture before any other treatment occurs. The flocculation unit is comprised of the following elements:

a contact tank with sufficient capacity for a typical period of 3 to 6 minutes, depending on the flow required upon leaving the system and the water quality necessary;

an overflow system identical to that of the first separator and likewise connected to a return line 46, via conduit 57;

a treatment tank with feeder pump; and treatment chemicals contained in a reservoir tank equipped with a feeder pump having a fixed-rate compartment, where injection of the flocculating agent into the contact tank is based on the rate of use, and is a variable depending on the water quality required.

As will be appreciated by those familiar with the art, the flocculation step may be eliminated if the solid particulate matter in the liquid effluent from separator 22 will permit the final step to clarify the liquid.

The next unit in the system is the fine filter means 35 which receives the liquid stream from unit 31 via conduit 32 which are fitted with valve 33 and tee-fitting 34. Filter unit 35 is of the counter-flow type which, as described in more detail below, provides significant advantages when combined with the other elements of this system.

In a preferred embodiment, the filter medium in filter unit 35 has a density lower than the specific gravity of the fluid to be treated, and operates by compression upward at increasing pressure, which permits essentially complete clarification of the liquid by removal of particles greater than one micron in diameter and accumulation of a cake of solids at the downstream surface of the filter medium. Rapid regeneration (one minute) can be effected with or without an inflow of water by using blasts of compressed air.

Other types of filters known to the art can readily be adapted for use in the system of the invention, and selection of the proper equipment will be based, in part, upon the degree of clarity required in the liquid medium as it is finally discharged for use or disposal. Thus, where governmental regulations mandate that no solid particulate matter greater than 25 microns be discharged into municipal sewers or streams the type of filter unit 35 and filter medium will be different than if drinking water is desired, where for aesthetic reasons at least, particle size should be no more than from about 0.5 to 1.5 microns. Suitable filter units and filter media are described in Perry's *Chemical Engineers' Handbook* (5th Ed.) at pages 19–61 to 19–98, the disclosure of which is incorporated herein by reference.

Draining of the filter unit 35 is accomplished via the drainage collector line 47 by automatic or manual valve 47a in the manner previously described with the other units.

The outlet conduit 36 conveys the clarified liquid from final filter unit 35 through flow meter 37 and from there to conduit 38 where it may be directed to other plant processes or disposed of in an environmentally acceptable manner via conduit 42, or recycled to storage vessel 1 via conduit 41. Flow meter 37 is capable of measuring an ultra-low flow to regulate and maintain the hourly flow posted in accordance with the water quality required from filtering unit 35. The flow-meter 37 acts directly on three-way modulating valve 40, making it possible to directly adjust the flow due to the increasing loss of load from the counter flow filter, within the clogging limits indicated at the differential gage pressure.

In addition, in a preferred embodiment, outlet flow meter 37 is connected by electro-mechanical or electronic means to fine filter inlet pressure gage 48 and outlet pressure gage 49, and also to three-way valve 28 which is on the outlet side of separator 22. In response to a pre-programed change in pressure across filter 35, and the flow through meter 37, a change in flow is effected by three-way valve 28 as controlled by flow-meter 37.

On the other side of filter inlet tee 34 is valve 39 and conduit 43 which connects filter unit 35 to decanting storage tank 44. Accumulated solids from filter unit 35 are back-washed by first introducing compressed air or other gas through conduit 51 and valve 52 followed by washing water through conduit 53 and valve 54 to dislodge the sludge from the filter medium and move it to decanting tank 44. Overflow conduit 46 returns excess fluid from tank 44 to tank 1. Settled solids are dropped from tank 44 through conduit 50 in waste collector means 45.

Alternatively, the back washing fluid containing accumulated solids from the filter medium is delivered to separator 22 for direct processing by means of conduits and related valves, which are not shown, for delivery to the inlet side of pump 19.

The system is especially suited for use in the following circumstances:

(a) as a mobile field unit which can be mounted on a trailer or truck bed with appropriate power-generating means for the pumps, to provide clarified drinking water from a source which is muddy or sandy such as a pool, pond or running stream;

(b) as a mobile unit which can be taken on site to treat accumulated wastes from facilities such as, for example, small chemical plants, petroleum processors or slaughter houses;

(c) as a permanent installation to remove sludge, chemical wastes, debris and the like, generated during any industrial or commercial process and to produce a clarified stream of water which can be recycled in the plant or dumped into the municipal sewers or an adjoining river or stream; and (d) as a mobile or permanent installation for use in conjunction with off-shore well drilling operations to remove sand and grit from sea water which is used in conjunction with the drilling.

The method and system can also be used as the primary step in dewatering chemical wastes, including hazardous wastes, in connection with chemical waste disposal. Impending governmental regulations in the United States are expected to preclude the land disposal of liquids in drum containers. The separation and collection of solids and clarification of carrier liquids will be necessary to effect economical and safe disposal of such wastes.

As a further advantage, the method and system of the invention can be used to effect the recovery of valuable solvents in an essentially purified form, i.e., free of solids, for re-use or for combustion as a fuel. In some cases, the solids recovered from the system may themselves be further processed for recovery of products having commercial value. In most cases, the volume of the solids recovered will be but a small fraction of the original liquid-solid mixture and can be handled and disposed of in a more economic manner than has been previously available to the art.

As will be apparent to those familiar with the art, if it is necessary to operate the system and process continuously in order to deal with the volume of the solid-containing liquid, or to provide a continuous output of clarified water, obvious modifications to the system can be made. Since the first and second separator means, 14 and 22 respectively, and fine filter unit 35 may have to be shut down periodically to remove accumulated solid material, duplicate units can be installed with appropriate conduits and valves to divert the flow from one unit to the other.

The entire system can be automated with the use of available monitors and sensors with related circuitry in conjunction with an appropriately programmed computer to adjust and direct the flow of the material through the system. Frequency of clean-out of a unit can be arbitrary programmed based on experience in operating the system in treating the same waste stream, or it can be triggered by a monitor associated with the separator or filter means which provides a signal when the unit approaches its capacity.

Obvious modification to the piping, pumps and other elements can be made to effect changes in the capacity and use of the system, for example, to increase the output of clarified water; to treat a slurry having a greater percentage of solids; to provide automated means to chemically treat the water for bacterial contamination; and to neutralize toxic chemical contaminants. For example, as shown in FIG. 1, tank 1', can be elevated above the height of the intake or feed line to first separator means 14 to permit gravity feed of the liquid containing solids through conduit 13'. In this embodiment, tank 1' is preferably fitted with stirrer 101, or other conventional agitator means to break up sedimentation and permit the mass to flow. Additional water or liquid may have to be added. Assuming sufficient flow rates, this alternative configuration would eliminate the need for primary pump 12. Such modifications do not depart from the purpose of the invention which is to provide a unitary and continuous process and system which combines the separation of heavy particles and debris with extra-fine filtration of a liquid medium, such as water, containing the solid particulate matter, at a substantially continuous flow rate, to effect the complete removal of sludge and particles contained in the liquid medium and the recovery of a clarified, and if desired, purified liquid. This process for the clarification of a liquid medium is accomplished by the steps of:

(a) continuously passing a stream of the liquid medium containing solid particulate matter through a first separator means to remove from the stream solid matter having a nominal diameter of greater than about 3 millimeters;

(b) discharging from the first separator means a stream of the liquid medium containing solid particulate matter having a nominal diameter of less than about 3 millimeters;

(c) pressurizing said stream of liquid medium discharged from the first separator means and passing said pressurized liquid stream through a second separator means;

(d) removing from the liquid stream in the second separator means solid particulate matter having a nominal diameter greater than about 75 microns and a density greater than about 1.3 times the density of the liquid medium;

(e) discharging the pressurized stream of the liquid medium from the second separator means at a substantially constant pressure and flow rate;

(f) delivering the pressurized stream of the liquid medium discharged from the second separator means to a fine filter means and separating from said liquid medium and retaining therein solid particles having a nominal diameter greater than about 1 micron; and (g) discharging from the fine filter means a continuous stream of clarified liquid medium.

The following modifications and adaptations are also contemplated as being within the scope of the novel process and system of the invention.

If the contents of tank 1 are found to contain dissolved chemical substances, such as toxic heavy metal salts, which cannot be removed by mechanical separation and filtration, preliminary chemical treatment can be employed. Solubilized materials can be neutralized by chemical treatment to produce environmentally acceptable compounds; or they can be converted to solids which will precipitate directly, or with the aid of flocculating agents. Acidic or basic conditions can also be neutralized in tank 1. Depending on the nature of the material, preliminary chemical treatment of the liquid can eliminate the need for use of the flocculating unit 31. In such a case the obvious adjustments are made to three-way valves 58 and 59, upstream and downstream of unit 31, respectively, to direct the liquid stream through by-pass conduit 60 and directly to filter unit 35.

It is to be understood that if water from a natural source such as a pond, pool, stream or even the sea is to be treated, tank 1 is not needed. In such circumstances a flexible intake hose can be advantageously substituted for conduit 11. The intake should be equipped with a screen to exclude rocks and debris greater than about 5 to 7 cm. Under most circumstances natural sources of fresh water will be free from toxic chemical pollutants, and only bacterial contaminants will require treatment to render the clarified water also pure, or potable. Conventional water purification chemicals can conveniently be added in the flocculating unit, if they are compatible and do not interfere with the action of the flocculant. Depending on the size and density of the solid particulate matter in the liquid medium and the acceptable degree of clarity, or turbidity, flocculation may be unnecessary and unit 31 can be adapted to operate to purify the passing liquid stream.

In its broad concept, the invention provides a system for the clarification of a liquid medium containing solid particulate matter which comprises:

(a) means for delivering a continuous stream of the liquid medium containing the solid particulate matter to a first separator means wherein solid matter having a nominal diameter greater than about 3 millimeters is removed from the stream;

(b) a pump capable of pressurizing the stream discharged from the first separator and conduits connecting the pump to the first separator means and to a second separator means;

(c) second separator means capable of removing from the pressurized liquid stream solid material having a nominal diameter less than about 3 millimeters and greater than about 75 microns;

(d) an optional flocculating unit, and associated conduits for receiving the liquid stream discharged from the second separator, said flocculating unit comprising means for chemically treating the liquid stream as it passes through to flocculate solid particulate matter suspended in the liquid stream;

(e) fine filter means and associated conduits for receiving the pressurized liquid stream discharged from the flocculating unit, said fine filter comprising a filter medium which entrains and separates from the continuous pressurized liquid stream passing therethrough, solid particles having a nominal diameter in excess of about one micron; and (f) discharge means associated with the fine filter unit for delivering a continuous pressurized stream of clarified liquid medium.

The following example is provided as a preferred embodiment of the invention and to illustrate the step-by-step functioning of the system and process. Individual elements are identified with reference to the drawings. Specific pieces of apparatus identified by manufacturer and model number are commercially available and are eminently suited for the practice of the invention. As will be apparent to those familiar with the art, other types of functionally equivalent equipment known to the art can readily be adapted for use in the system.

Figure 2:
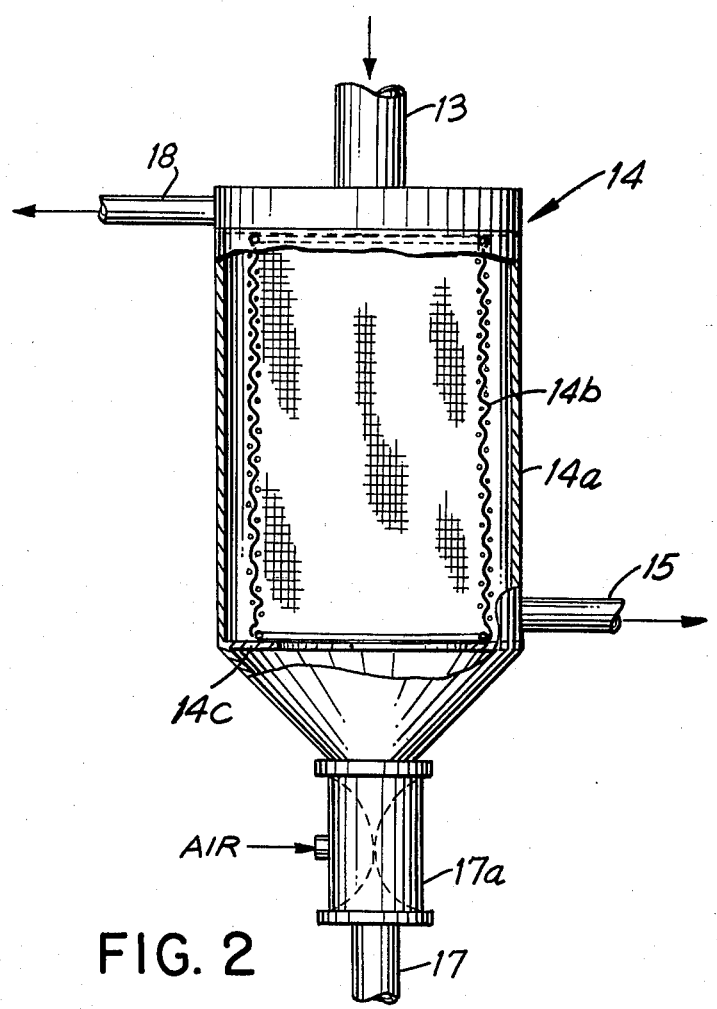
FIG. 2 is a vertical cross-sectional view of one embodiment of element 14, hereinafter referred to as the first separator means.

An aqueous chemical sludge 7, contained in storage vessel 1, is at a pH of about 7.2 and contains no dissolved toxic compounds as a result of prior testing and chemical treatment. Pump 12 is started and a liquid stream comprising the aqueous liquid medium containing solid particulate matter is drawn up through conduit 11, a three inch or 75 mm, rigid PVC pipe. Pump 12 is a pneumatically operated double diaphram type capable of passing solid debris of from 3 to 7 cm nominal diameter. A suitable pump 12 is available from UNITEC of Paris, France, and is known as the Sandpiper (R) model. Pump 12 delivers 20 m$^3$/hr to first separator means 14 through conduit 13, also a three inch PVC pipe. Separator 14 comprises an outer vessel 14a about 0.7 m high and 0.5 m in diameter, having a tapered solids collection section terminating in clean-out valve 17a. As shown in FIG. 2, a cylindrical basket 14b is concentrically positioned within vessel 14a and rests on collar 14c. Basket 14b has a diameter of about 0.3 m and is fabricated from a stainless wire mesh having openings 3 mm by 3 mm. The liquid stream is delivered by conduit 13 to the interior of basket 14b; separated solid particulate matter collects in the tapered lower section of 14a and part of the liquid stream passes radially outwardly through the mesh and is discharged through conduit 15 which communicates with the cylindrically space between vessel 14a and basket 14b. As will be apparent to those skilled in the art, other types of separator means, such as vibrating screens and the like, can be employed to remove solids at this step in the process. For reasons explained below, the volume of the liquid stream delivered to separator means 14 should be in excess of the discharge, and the overflow is returned to vessel 1 by return conduit 18. Accumulated solids, such as pebbles, wood, concrete, metal scraps, etc., are periodically removed by opening pneumatic bushing valve 17a for discharge via conduit 17 into waste collector 16. Valve 17a can be a pinch type flexible diaphragm valve, either pneumatically or manually operated. Suitable valves and conduits (not shown) can be provided for draining separator 14 when the system is shut down for maintenance.

Conduit 15, and all other conduits in the system described in this example are 2" i.d., or about 50 mm, and are preferably fabricated from stainless steel or other chemically resistant alloys. Obviously, all conduits and the internal surfaces of all filter units, gages, meters and other pieces of equipment must be resistant to the particular liquids and solids being treated in the system.

Pump 19 is also of the vortex, centrifugal or turbine type with a capacity of about 10 $m^3$/hr at a pressure of from 1.5 to 2.5 bar (1 bar=100 psi). A suitable centrifugal pump is manufactured by Pompe Guinard under the size designation "3×16" capable of operation at 2900 gpm. The pressurized liquid stream is delivered via conduit 20 to second separator means 22, at a pressure of about 1.5 bar and a flowrate of 10 $m^3$/hr. The solids content of the stream is about 40 gm/liter of water. Suitable apparatus for use as separator means 22 is sold by the Claude Laval Corporation of Fresno, Calif. under the designation Lakos (R) separator. It is capable of removing particles ranging from 6 mm down to about 75 microns, with 98% effectiveness at the lower end for particles having a density of 1.3 to 1.5 times the density of the liquid medium. The Lakos separator provides the added advantage that it is also a static system and requires no power input. However, other centrifugal separators known in the art, such as the rotating disc type, can be employed at this step in the process.

The liquid stream discharged from the second separator means 22 via conduit 24 contains approximately 30 mg of solids per liter of water. Conduit 24 is fitted to flow meter-control device 26 which, in conjunction with intake pressure gage 21 and discharge pressure gage 25, regulates the flow to insure the efficient operation of separator 22. Separators of the Lakos type described above and of the centrifugal disc type are designed for optimal operation at a specified pressure drop or differential. Gages 21 and 24 can be of the manometer type connected via conventional circuitry to flowmeter-control 26. In the example, the optimum pressure differential across separator means 22 is from 0.5 to 0.7 bar, and if the pressure differential drops below this level the control valve 26 closes slightly; conversely, if the pressure differential exceeds the desired maximum, valve 26 opens. Flowmeters sensitive to metallic particles (i.e., magnetic type) should not be used as they be affected by ferrous materials in the solid particulate matter.

Conduit 30 delivers the liquid stream to flocculation unit 31 wherein it is treated with suitable flocculating agents, such as aluminum sulfate aluminum chloride, ferric sulfate, or ferric chloride to accomplish the micro-flocculation step. A suitable flocculation unit is manufactured by Dosapro-76-Pout. Saint Pierre, France. The unit is capable of a micro-flocculation process within three to six minutes at steady state conditions. An injection pump delivers a metered quantity of the flocculating agent to the contact tank. Other commercially available units may be used depending on the flow requirements and the desired quality of the water. The treated liquid stream is discharged from unit 31 via conduit 32, through shut-off valve 33 and enters fine filter means 35 via tee-fitting 34. Back washing discharge valve 39, located on the other side of tee-fitting 34 is closed. Fine filter unit 35 contains a filter medium capable of entraining solid particulate matter greater than about one micron nominal diameter when the liquid medium passes through under steady-state conditions. The clarified liquid medium is discharged from filter unit 35 via conduit 36 and is substantially free of particles larger than about 1 micron.

In order to insure the efficacy and most efficient operation of fine filter means 35 the following additional elements are provided which function as described.

Pressure gages 48 and 49 are provided on the feed and discharge conduits of unit 35 and are connected by suitable circuitry to an alarm device to alert operators when a predetermined maximum pressure differential has been reached so that the filter medium can be replaced or regenerated by back washing to remove the accumulated cake.

Figure 3:
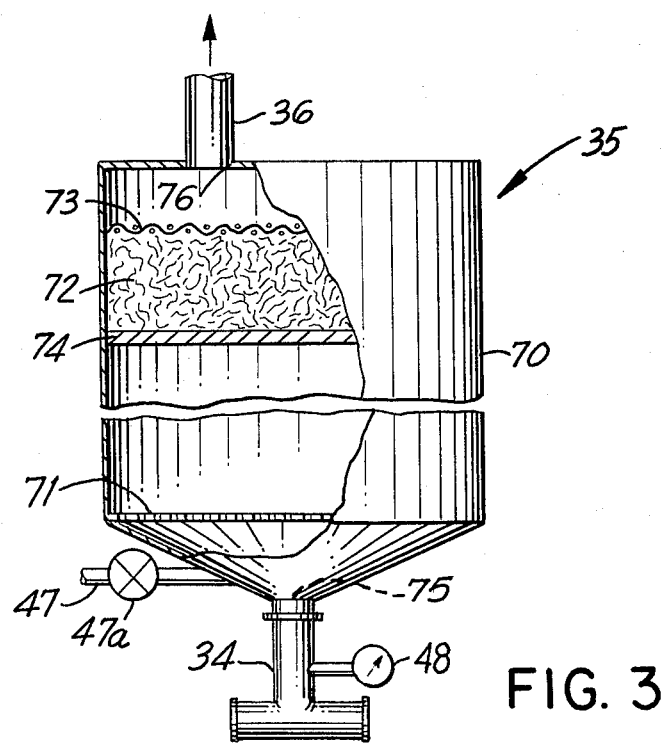
FIG. 3 is also a vertical cross-sectional view which schematically depicts the construction of a preferred embodiment of element 35, hereinafter referred to as the fine filter means.

In a preferred embodiment, the fine filter means is of the counter-flow type and comprises a compactable filter medium which has a density lower than that of the specific gravity of the liquid medium being treated. The construction of this type of filter means is shown in FIG. 3.

Filter body 70 is of rigid construction fabricated to safely withstand a maximum pressure of up to about 2.0 bar which may be developed in the system. Body 70 is fitted with feed port 75 and discharge port 76, which are connected to previously described elements 34 and 36. Adjacent the feed port 75 is incoming liquid diffuser means 71 which is fitted within body 70 transverse to the direction of fluid flow and contains evenly spaced openings ranging in size from 1.5 $cm^2$ to 5.0 $cm^2$ over from 60 to 80% of its surface. Adjacent the discharge port 76, filter medium retaining means 73 is securely fitted within body 70, also transverse to the direction of fluid flow. Retaining means 73 can be constructed from materials such as wire mesh, rods or perforated plate that will prevent the filter medium from passing without unduly impeding the liquid flow. As shown in FIG. 3, filter cake 74 has accumulated against the feed or pressurized side of filter medium 72. As will be appreciated by those skilled in the art, when a fibrous or porous polymeric filter medium is employed it may be necessary to pre-coat the filter in order to form a cake and thereby accelerate the removal of particles below about 75 microns.

In a preferred embodiment, the space in filter body 70 between diffuser 71 and retainer 73 is loosely packed with pieces of shredded flexible polyurethane foam having random shapes and ranging in size from about 1.5 cm to 5 cm along the maximum dimension. This material has a density less than that of water and most organic solvents, i.e., about 30 to 40 gm/liter, and is readily compressible. It is an open cell foam, with cell size from about 0.2 to 0.6 mm. When the filter unit is in operation the polyurethane filter medium is compressed to about one-third of its original volume by the flow of the pressured stream of the liquid medium, and under steady-state conditions is capable of removing solid particles having a nominal diameter of about 1 micron or greater.

Since the effectiveness of the filtration depends on the flow rate of the liquid through the unit, flowmeter-control 37 is fitted to discharge conduit 36 downstream of gage 49. Flowmeter-control 37 is connected via appropriate circuitry to conventional electro-mechanical means that controls three-way diverter valve 28 which is located downstream of flowmeter 26. A suitable device is available from D. Guermonprez S.A. of Monsen-Baroeul, France as the model DA ultrasonic flowmeter.

If the flow rate through filter unit 35 exceeds predetermined limits then diverter valve 28 is activated to discharge a portion of the flow from conduit 30 (which is feeding filter 35) and into conduit 29 for return to vessel 1. Employing these means of control the output of the constant speed pump 19 can be adjusted to vary flow rates and pressures across the second separator means 22 and filter means 35. Obviously, visual observation of the several gages and the flowmeters, as well as manual control of the valves can be provided by one or more trained personnel. However, in the preferred embodiment the entire operation, including the back-washing step which is described below, can be controlled by a suitably programmed computer of the type currently available in the art, located remote from the installation.

When the filter cake reaches a certain density or thickness, the pressure differential across the filter unit 35 will exceed a predetermined maximum level as shown by gages 48 and 49. When this occurs, the system is either shut down by stopping pumps 12 or 19, or by diverting all of the liquid stream through valve 28 to conduit 29. If the latter action is taken, separators 14 and 22 will continue to remove solid matter for collection in container 16. Filter 35 is drained by opening valve 47a to return conduit 47; valve 47a is then closed. Valve 39 is then opened to conduit 55 which leads to decanting tank 44. As shown in FIG. 1, tank 44 is of the laminar flow type. Valve 40 on discharge conduit 38 is also closed. Pressurized air from an external source (not shown) is admitted to the downstream side of the filter medium by opening valve 52 to conduit 51. After about 5 seconds valve 52 is closed, and valve 54 is opened to similiarly admit back-washing water at about 1.0 bar for a period of from 5 to 60 seconds. Valve 54 is closed and the same procedure is repeated again. The filter cake is now purged from the system and transferred to vessel 44 for sedimentation. It is removed after settling by opening valve 50a to conduit 50 for recovery in waste collection means 45. With the filter medium regenerated, valve 39 is closed and valves 33 and 28 are opened to permit resumption of the liquid flow to filter unit 35. A turbidity measuring means 61 is fitted to discharge conduit 38 to determine the clarity of the water leaving the system. Since clarity requirements may not be met until the system reaches a steady-state operating condition, three-way valve 40 is provided so that the discharge can be directed back to vessel 1 via return conduit 41. When requirements are met, valve 40 is adjusted to provide discharge of the clarified water through conduit 42 for subsequent use or further treatment.

Figure 4:
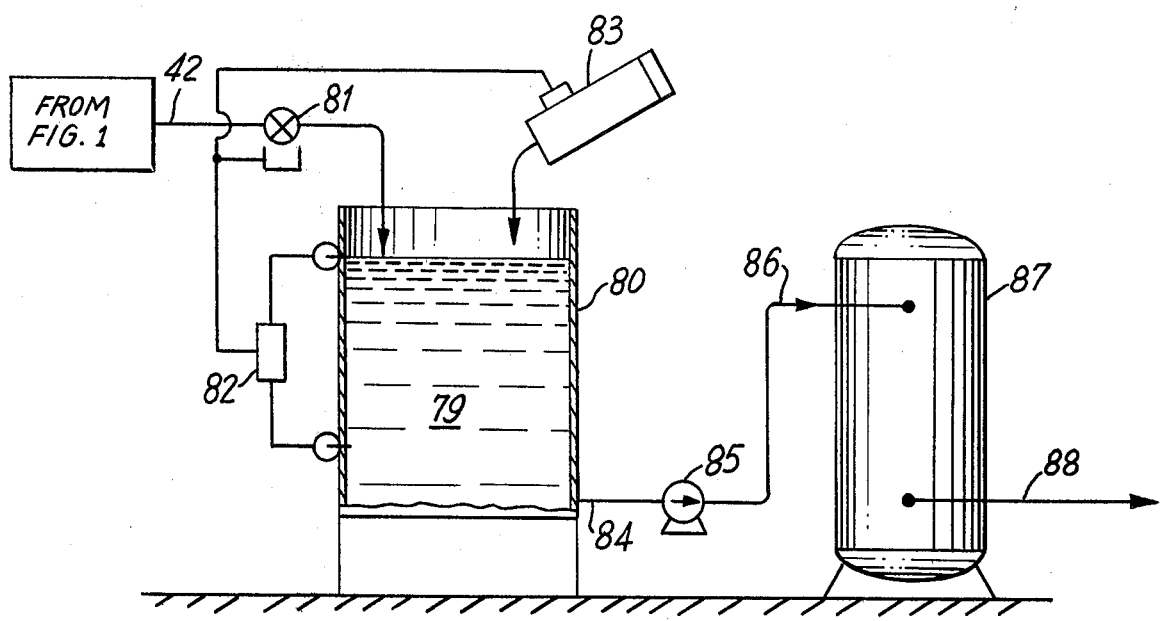
FIG. 4 is a schematic view of further embodiment illustrating a system and apparatus for purifying the liquid stream discharged from FIG. 1.

If necessary, a final purification step can be incorporated directly into the unitary system described above to produce potable water. As schematically illustrated in FIG. 4, conduit 42 delivers the clarified stream to treatment tank 80 which is equipped with high and low liquid level sensor means 82. Sensor means 82 are wired to electro-mechanically operate supply valve 81 which controls the flow of water to tank 80 in response to signals generated by sensors 82. Chlorinator unit 83 comprises means for periodically dispensing a source of chlorine in either solid or liquid form into treatment tank 80 to kill bacteria and viruses. A suitable device is marketed by Land Products, Inc. of Milwaukee, Wis. under the tradename Land-O-matic and dispenses high concentration dry chlorine pellets via a pre-programmed electro-mechanical apparatus. Chlorinator unit 83 can also be wired to sensor means 82 so that the rate of chlorine addition is proportional to the flow of water through tank 80. Discharge conduit 84 delivers chlorinated water from tank 84 to pump 85, and a pressurized stream is delivered via conduit 86 to vessel 87 which contains a bed of activated carbon for removal of residual chlorine to thereby improve the flavor of the water which is discharged via conduit 88. Passage of the purified water through the activated carbon of vessel 87 is an optional treatment step which may not be necessary if sufficient time following treatment is allowed to permit the dissipation of dissolved chlorine from the water.

The specific embodiment described above is intended to be representative and illustrative of the method and the system of the invention which can be modified without departing from the spirit and the scope of the invention which is to be determined by the following claims.

What is claimed is:

1. In a continuous process for the clarification of a liquid medium containing solid particulate matter, the improvement which comprises the steps of
   (a) continuously passing a stream of the liquid medium containing solid particulate matter through a first separator means to remove from the stream solid matter having a nominal diameter of greater than about 3 millimeters;
   (b) discharging from the first separator means a stream of the liquid medium containing solid particulate matter having a nominal diameter of less than about 3 millimeters;
   (c) pressurizing said stream of the liquid medium discharged from the first separator means and passing said pressurized liquid stream through a second pressurized separator means;
   (d) removing from the liquid stream in the second pressurized separator means solid particulate matter having a nominal diameter greater than about 75 microns and a density greater than about 1.3 times the density of the liquid medium;
   (e) discharging the pressurized stream of the liquid medium from the second separator means while maintaining a substantially constant pressure differential across the second separator by volumetric flow rate control means downstream of the second separator;
   (f) delivering the pressurized stream of the liquid medium discharged from the second separator means to a pressurized fine filter means and separating from said liquid medium and retaining therein solid particles having a nominal diameter greater than about 1 micron while maintaining the flow rate within a predetermined range;

(g) maintaining the flow rate through the fine filter means by variable discharge flow rate control means intermediate the second separator means and fine filter means whereby a portion of the pressurized stream of the liquid medium is discharged to collection means at atmospheric pressure for re-cycling to the first separator means; and (h) discharging from the fine filter means a continuous stream of clarified liquid medium.

2. The process of claim 1 which further includes the step of delivering the stream of liquid medium discharged from the second separator means to flocculation means and continuously chemically treating the liquid medium to flocculate solid particles suspended in the liquid stream, and thereafter delivering the stream of liquid medium containing flocculated solid particles to the fine filter means.

3. The process of claim 1 in which the liquid stream discharged from the first separator is pressurized by means of a vortex pump.

4. The process of claim 1 in which the first separator means is static.

5. The process of claim 4 wherein the volumetric flow rate of the liquid medium into the first separator means exceeds the flow rate of the discharged liquid medium.

6. The process of claim 5 wherein the volumetric flow rate to the first separator is from 1.2 to 2 times the flow rate of the discharge.

7. The process of claim 1 wherein the fine filter means comprises a compressible porous filter medium having a density lower than that of the liquid medium and solid particulate matter is retained in the form of a cake.

8. The process of claim 1 wherein the fine filter means is back-washed to recover the solid particles retained therein.

9. In a system for the clarification of a liquid medium containing solid particulate matter, the improvement which comprises (a) means for delivering a continuous stream of the liquid medium containing the solid particulate matter to a first separator means wherein the solid matter having a nominal diameter greater than about 3 millimeters is removed from the stream;

(b) a pump capable of pressurizing the stream discharged from the first separator and conduits connecting the pump to the first separator means and to a second pressurized separator means;

(c) second pressurized separator means capable of removing from the pressurized liquid stream solid material having a nominal diameter less than about 3 millimeters and greater than about 75 microns;

(d) in line flow rate control means and associated conduits for receiving the liquid discharged from the second separator, said control means comprising means for maintaining a substantially constant pressure and flow rate through said second separator;

(e) a three-way valve and associated conduits for receiving the liquid discharged from the in line flow rate control means and responsive to the flow rate control means for diverting a portion of the liquid for recycling to the first separator means;

(f) a pressurized fine filter means and associated conduits for receiving the pressurized liquid stream discharged from the three-way valve, said fine filter means comprising a filter medium which entrains and separates from a continuous pressurized liquid stream passing therethrough solid particles having a nominal diameter in excess of about one micron;

(g) discharge means associated with the fine filter means for delivery of a stream of clarified liquid medium; and (h) a flowmeter-control means associated with the discharge means for operating said three-way valve to maintain the flow rate through said fine filter means within predetermined limits.

* * * * *